United States Patent [19]
Argumedo et al.

[11] Patent Number: 5,519,562
[45] Date of Patent: May 21, 1996

[54] COMPLIANT TAPE GUIDE

[75] Inventors: Armando J. Argumedo; Steven L. Felde, both of Tucson, Ariz.; Douglas W. Johnson, Rochester, Minn.; Robert P. Zammit, Tucson, Ariz.

[73] Assignee: International Business Machines Corporation, Armonk, N.Y.

[21] Appl. No.: 405,418

[22] Filed: Mar. 15, 1995

Related U.S. Application Data

[63] Continuation of Ser. No. 110,670, Aug. 23, 1993, abandoned.

[51] Int. Cl.$^6$ .................................................. G11B 15/60
[52] U.S. Cl. ............................. 360/130.21; 360/130.33; 226/198; 242/346
[58] Field of Search ............................. 360/95, 130.21, 360/130.22, 130.23, 130.3, 130.2, 130.33, 130.31; 242/197, 198, 199, 76, 326.4, 346, 346.2, 615.2, 615.4; 226/198, 199, 196

[56] References Cited

U.S. PATENT DOCUMENTS

| | | | |
|---|---|---|---|
| 3,643,849 | 2/1972 | Roberts | 226/199 |
| 3,768,717 | 10/1973 | Salcedo | 226/198 |
| 3,777,070 | 12/1973 | Bumb, Jr. | 179/100.2 Z |
| 3,800,318 | 3/1974 | Jantzen | 360/84 |
| 3,850,358 | 11/1974 | Nettles | 226/198 |
| 3,912,144 | 10/1975 | Arseneault et al. | 242/76 X |
| 3,939,494 | 2/1976 | Okuda | 360/84 |
| 3,995,318 | 11/1976 | Serizawa | 360/130 |
| 3,996,619 | 12/1976 | Firth | 360/130 |
| 4,348,706 | 9/1982 | Videc | 360/130.24 |
| 4,485,420 | 11/1984 | Schoenmakers | 360/130.21 |
| 4,875,126 | 10/1989 | Nakamichi | 360/130.23 |
| 4,875,127 | 10/1989 | McClure | 360/130.21 |
| 4,894,737 | 1/1990 | Hamana et al. | 360/130.21 |
| 4,903,879 | 2/1990 | Noguchi et al. | 226/199 |
| 4,939,606 | 7/1990 | Nakanishi | 360/107 |
| 4,962,438 | 10/1990 | Kunze | 360/130.21 |
| 5,050,028 | 9/1991 | Schandl | 360/130.23 |
| 5,251,844 | 10/1993 | Albrecht et al. | 226/198 X |
| 5,294,072 | 3/1994 | East et al. | 242/199 |
| 5,430,922 | 7/1995 | Church et al. | 29/407 |

FOREIGN PATENT DOCUMENTS

| 9103052 | 3/1991 | WIPO | 242/197 |
|---|---|---|---|

OTHER PUBLICATIONS

IBM TDB vol. 27 No. 7B pp. 4360, 4361 Dec. 1984 R. Andresen et al.

*Primary Examiner*—Stuart S. Levy
*Assistant Examiner*—William J. Klimowicz
*Attorney, Agent, or Firm*—Baker, Maxham, Jester & Meador

[57] ABSTRACT

A compliant tape guide in a tape cartridge loads edge of a tape with an optimum pressure and a minimum of vibration by a series of compliant spring arms which transmit a guiding load to the edge through a flexible metal foil. The metal foil contacts the tape over a specified arc length in which the tape is supported by a curved guide bearing.

36 Claims, 7 Drawing Sheets

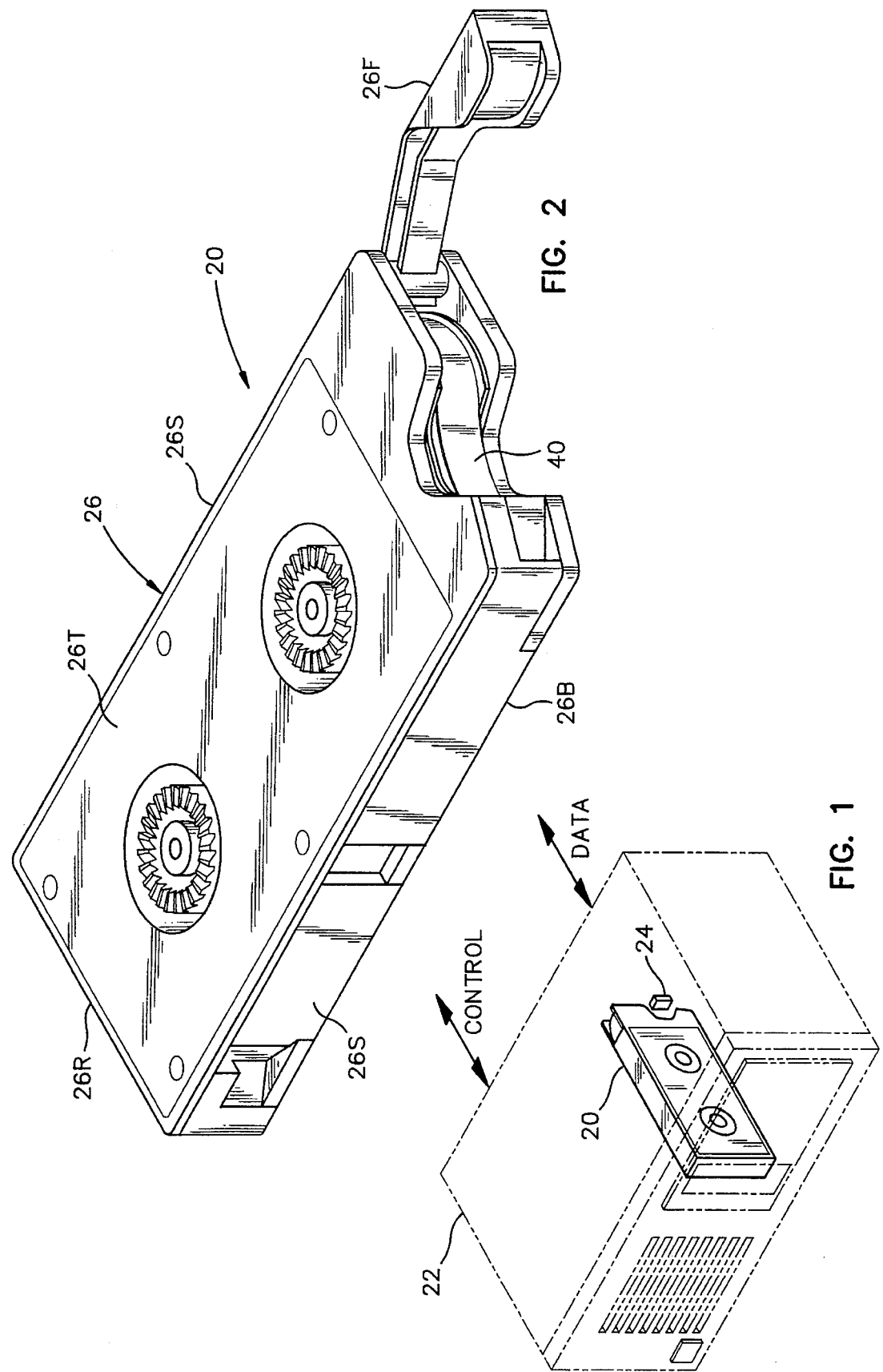

COMPLIANT TAPE GUIDE

This application is a continuation of application Ser. No. 08/110,670, filed Aug. 23, 1993, now abandoned.

BACKGROUND OF THE INVENTION

1. Field of the Invention

The present invention relates to a tape guide for a magnetic tape cartridge and/or tape drive, and more particularly to a tape guide which provides a fixed guide for one edge of a magnetic tape and a spring biased guide for an opposite edge of the tape.

2. Discussion of the Related Art

It is important that a magnetic tape handling device, such as a magnetic tape cartridge and/or drive, provide a reliable tape path on which a magnetic tape may be transported past a magnetic write/read head. This is especially true when a large number of narrow tracks are recorded on the tape, thereby requiring the head to follow the same path during playback that it followed during recording. When the playback path differs from the recording path, there can be a pronounced distortion of the playback signal and a serious loss of signal magnitude. The difficulty in maintaining a reliable tape path is due to the tolerances in the manufacture of tape guides and the tape itself. The tolerances may be in the order of plus or minus two or three thousandths of an inch for each component. A tape guide typically includes a curved element which has a curved surface for guiding the lengthwise travel of the tape and a pair of spaced-apart flat surfaces for guiding the top and bottom edges of the tape. If both flat surfaces of the guide are fixed in a spaced-apart relationship with respect to one another for accommodating a selected nominal tape width, the guide may be too tight or too loose for any particular tape of the nominal width due to the manufacturing tolerances. One of these conditions will cause or allow lateral movement of the tape, the other will cause excessive wear of the tape edge, both will result in an unreliable tape path.

In order to prevent lateral movement of the tape, the prior art provides a fixed guide for one edge of the tape and a resilient guide for the opposite edge of the tape. With this arrangement, the resilient guide is biased against the opposite edge to maintain the one edge in constant engagement with the fixed guide. One prior art resilient tape guide arrangement provides a plurality of elongated springs, one end of each spring being fixed in place and the other end of the spring, which is movable, directly engaging an edge of the tape. Sometimes the movable ends of the springs are provided with ceramic tips so as to reduce wear of the tape and tape guide. Another prior art arrangement is to employ a rigid diaphragm, one end of the diaphragm being pivoted to a fixed base and the other end of the diaphragm being biased against an edge of the tape by a compression spring.

A problem with these aforementioned arrangements, as well as other prior art arrangements, is that unacceptable wear takes place at the edge of the tape which is engaged by the resilient guide. In both of the prior art arrangements the area or areas of contact between the resilient guide and the tape edge are relatively localized. The ceramic tips of the resilient fingers engage the tape edge at a plurality of localized areas while the rigid diaphragm engages the tape edge over a larger but single and less compliant area. The result is wear of the tape and creation of debris which is detrimental to the recording process. However, there is even a more serious problem with the prior art resilient guide arrangements. This is the vibration that is set up in the resilient guide components as the tape travels lengthwise along the curved surface of the tape guide. This is due to the relatively large mass of these components coupled to a spring, and due to the absence of damping. When the moving tape exerts rapid lateral or longitudinal forces on the resilient tape guide, the tape guide responds by vibrating. The vibration of the resilient tape guide components is then transferred back to the tape, resulting in deviation from a nominal tape path and nominal tape velocity. This causes a degradation of recording and playback functions. Therefore, there is a need for a spring-biased tape guide which will maintain a relatively undeviating tape path without effect on velocity and without the generation of debris.

SUMMARY OF THE INVENTION

The present invention provides a novel spring-biased compliant tape guide which guides a magnetic tape in a highly reliable path past a write/read head. Further, the novel tape guide does not create tape debris nor does it transfer detrimental vibrations back to the tape. The tape guide can be employed in a magnetic tape cartridge and/or in a tape drive. The compliant tape guide exerts a guiding load on the edge of a tape by means of a series of compliant spring arms through a flexible metal foil which separates the spring arms from the tape. The metal foil is in continuous contact with the tape over a specified arc length, in which the tape is supported by a curved tape bearing. The foil distributes the guiding load applied by the spring arms by means of a smooth surface which contacts the tape.

Each tape guide includes a curved element, the curved element having top and bottom surfaces with a curved guide bearing therebetween. The curved guide bearing supports lengthwise travel of the tape. A component is fixed in relationship to the curved element for providing a fixed guide for one edge of the tape. The curved element has a curved edge at one extremity of the curved guide bearing. A sheet of flexible foil is fixed in relationship to the curved element and extends beyond the curved edge of the curved element to provide a cantilevered foil portion which is engageable with a second edge of the tape. A spring device is mounted in a fixed relationship with respect to the curved element for urging the cantilevered foil portion toward the second edge of the tape. With this arrangement the foil and the spring device provide a variable guide for the second edge of the tape. The preferred spring device includes a plurality of elongated cantilever-type springs, each of which is configured in the shape of a finger. These springs may be referred to as "finger springs." One end of the spring device is mounted in a fixed relationship with respect to the curved element and the other end of the spring device engages the cantilevered foil portion urging it against the second edge of the tape. With this novel arrangement, the spring forces of the finger springs are distributed over a predetermined length of the second edge of the tape as the tape travels around the curved guide bearing. The contact between the finger springs and cantilevered foil permits frictional damping to occur while relative motion between the springs and foil exists. This load distribution virtually eliminates the production of tape debris, and the frictional damping virtually eliminates the detrimental vibrations of the spring-biased components of the tape guide. Accordingly, the present invention provides an extremely reliable tape path past a magnetic head which is performing recording or playback functions in response to a magnetic tape moving longitudinally on the tape path.

An object of the present invention is to overcome the aforementioned problems associated with prior art resilient type tape guides.

Another object is to provide a recordable media tape handling device which will guide a magnetic tape along a reliable path past a head which is performing recording or reproduction functions in response to the magnetic tape.

A further object is to provide a recordable media tape handling device which has one or more tape guides which will establish a reliable tape path for a magnetic tape without the generation of tape debris and without the transfer of detrimental vibrations back to the tape.

Still another object is to provide a magnetic tape cartridge of the type which has a pair of reels which move the magnetic tape across a pair of spaced-apart tape guides, each tape guide distributing a spring-biased load to one edge of the tape so that: (1) the tape follows a reliable path, and (2) the generation of tape debris and the transfer of vibrations from the guide components to the tape are minimized.

Still a further object of the invention is to provide one or more guides for a recordable media handling device which are easy to manufacture and assemble and which will provide a reliable tape path with a minimum of tape and guide wear and tape vibration as a magnetic tape is moved on the tape path past a recording/playback head.

Other objects will become readily apparent from reading the following detailed description and claims taken in conjunction with the accompanying drawings.

BRIEF DESCRIPTION OF THE DRAWINGS

FIG. 1 is a schematic illustration of a magnetic tape cartridge mounted within a drive for processing by a recording/playback head, either or both of these devices employing one or more tape guides illustrated in the following figures.

FIG. 2 is an isometric view of an exemplary magnetic tape cartridge which employs a pair of tape guides according to the teachings of the present invention.

DESCRIPTION OF THE PREFERRED EMBODIMENTS

Figure 3:
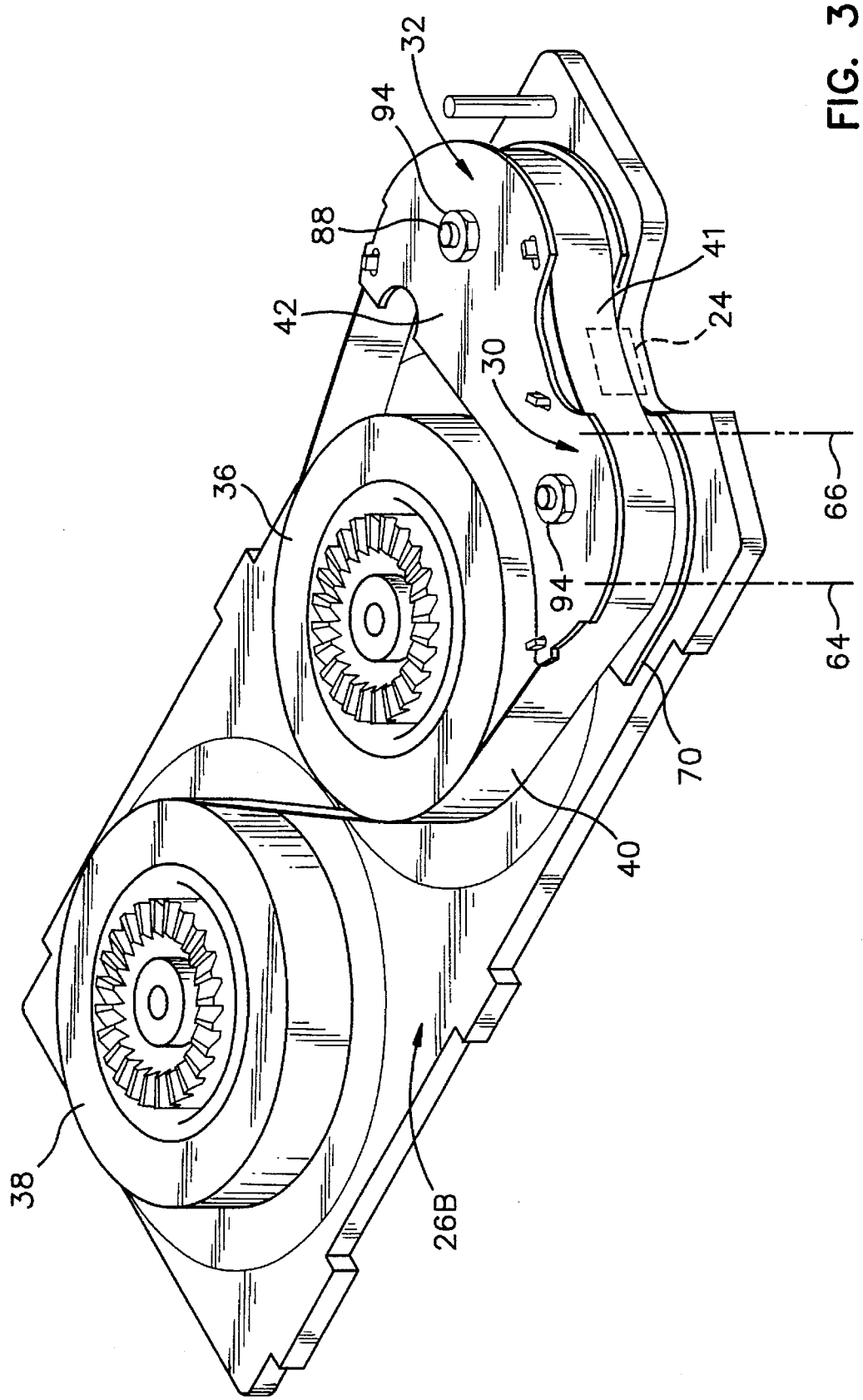
FIG. 3 is an isometric view of the cartridge of FIG. 2 with the cover removed to show various details of a pair of tape guides.

Referring now to the drawings wherein like reference numerals designate like or similar parts throughout the several views, there is illustrated in FIG. 1 a recordable media tape handling device, such as a magnetic tape cartridge 20, which is mounted within a magnetic tape cartridge drive 22 for processing. The cartridge 20 contains a magnetic tape (not shown). The drive 22 includes conventional transport mechanisms for engaging the cartridge and moving the tape therein. The drive 22 includes a write/read ("recording/playback") head 24 so that when the tape is moved past the head, the head can perform recording and playback functions. The tape may be moved passed the head by power drives (not shown) within the drive 22 which selectively rotate one or the other of a pair of reels within the cartridge 20 which will be described in more detail hereinafter. For both recording and playback purposes it is necessary that the tape move along a very reliable path relative to the head 24. The invention provides one or more tape guides for implementing such a tape path. In the exemplary embodiment a pair of tape guides are employed within the cartridge 20, however, it should be understood that one or more of these tape guides could be employed by the drive 22 or any other recordable media tape handling device which is involved in processing tape for storage (recording) and extraction (playback) of signals.

Figure 4:
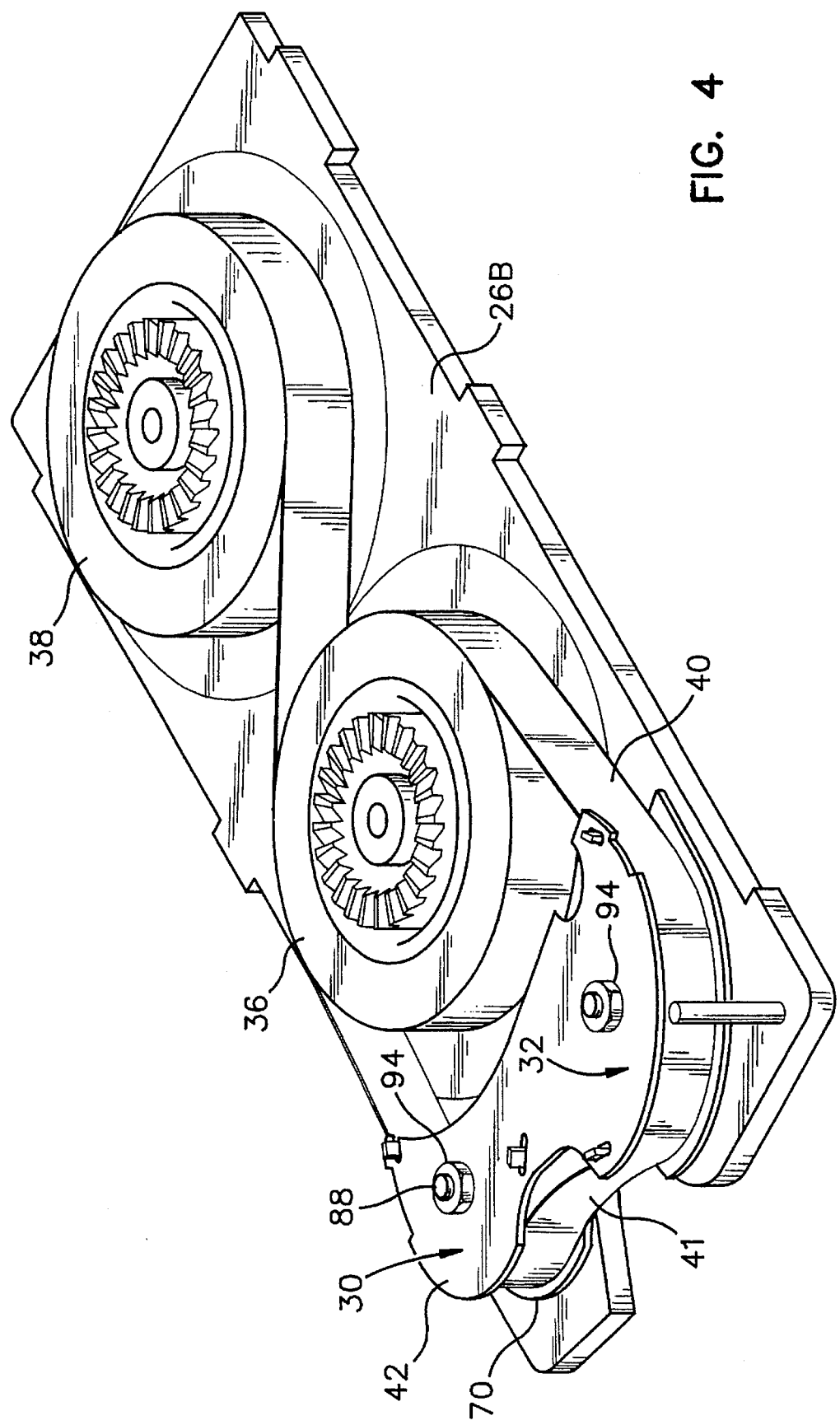
FIG. 4 is the same as FIG. 3 except the view is taken from an opposite side of the cartridge.

As illustrated in FIG. 2 the cartridge 20 has a generally elongated container 26 with a cover made up of a top plate 26T, door 26F, rear plate 26R, and a pair of side plates 26S. The cover fits to a bottom plate 26B. In FIGS. 3 and 4, the cover has been removed to illustrate some of the details of a pair of tape guides, generally illustrated at 30 and 32. A pair of reels 36 and 38 are rotatably mounted in the container in a longitudinally spaced-apart relationship for storing a magnetic tape 40. The top plate 26T of the cover has a pair of openings (not shown) which enable components (not shown) of the cartridge drive to selectively rotate one or the other of the reel hubs so as to move the tape in one direction or the other past the head 24.

The tape guides 30 and 32 as illustrated in FIG. 3 are mounted within the cartridge container 26 in a laterally spaced apart relationship so that a controlled length 41 of the tape between the guides can be moved past the head 24 for processing. It is important that this controlled length 41 follow a reliable path so that recording and playback functions are accurately implemented. From the rear reel 38 the tape extends past the front reel 36 to the tape guide 30 and from the tape guide 32 the tape wraps around the front reel 36. It can be visualized that if the rear reel 38 is rotated in a counterclockwise direction, as seen in FIGS. 3 and 4, that the tape will be wrapped onto this reel and unwrapped from the front reel 36, causing the tape to travel in one direction with respect to the head 24. However, if the front reel 36 is rotated in a counterclockwise direction, the tape will be wrapped onto the front reel 36 and unwrapped from the rear reel 38 so as to cause the tape to travel in an opposite direction with respect to the head 24. This arrangement is well known in the art and is employed by magnetic tape cartridges which are commercially available.

Figure 6:
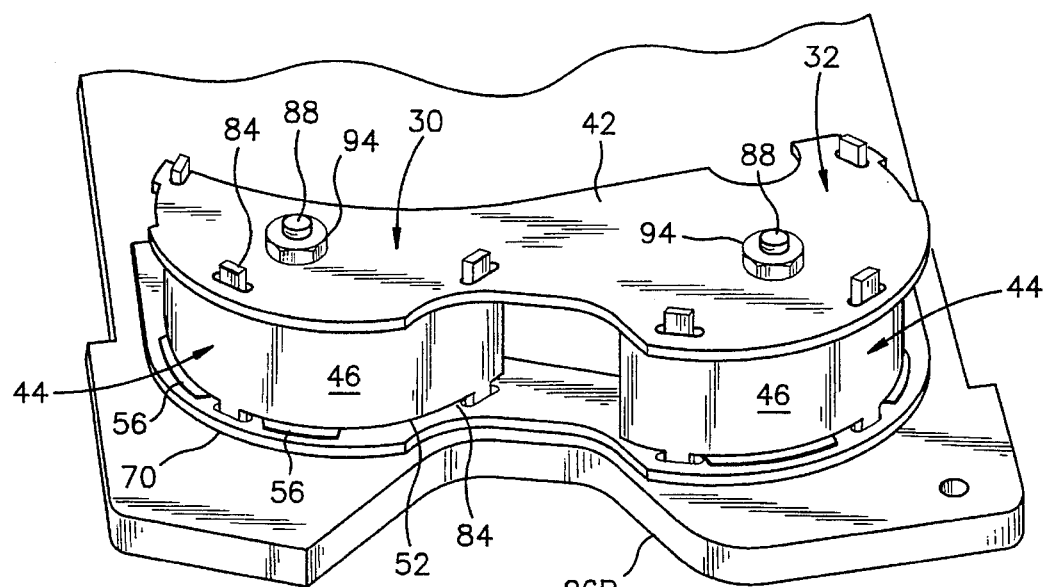
FIG. 6 is an enlarged isometric top view of the pair of tape guides with the tape removed.
Figure 7:
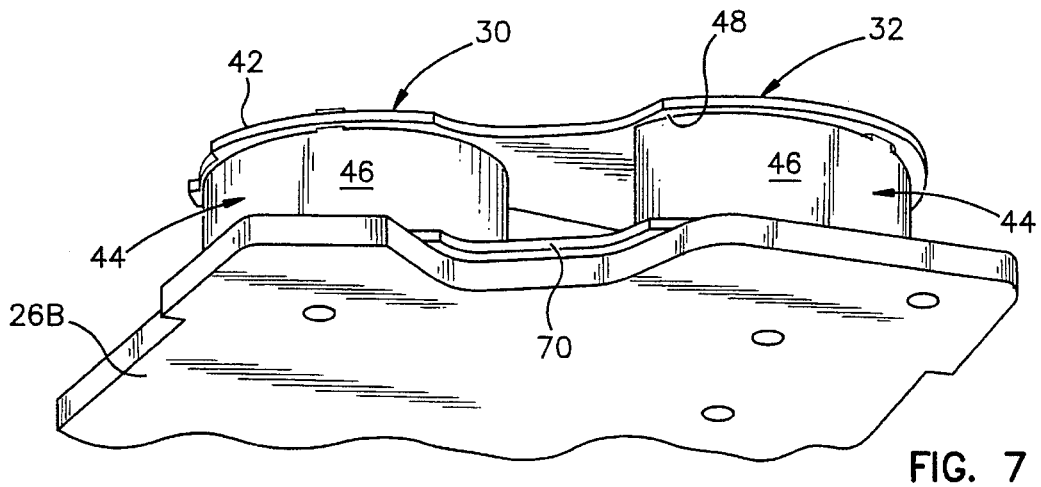
FIG. 7 is an enlarged isometric bottom view of the pair of tape guides with the tape removed.
Figure 9:
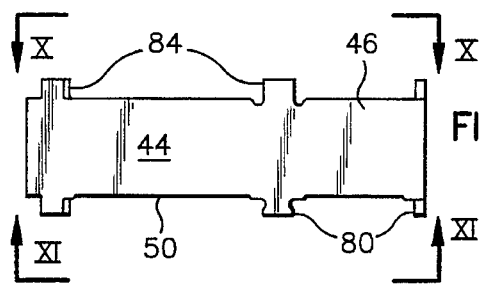
FIG. 9 is front planar view of the curved element of one of the tape guides.
Figure 10:
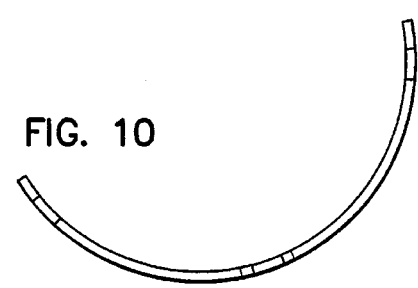
FIG. 10 is a view taken along plane X—X of FIG. 9.
Figure 11:
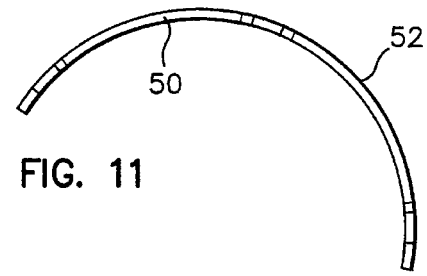
FIG. 11 is a view taken along plane XI—XI of FIG. 9.

The present invention provides tape guides 30 and 32 which will ensure that the tape follows a reliable path past the read/write head 24. Since the tape guides 30 and 32 are substantially identical the following description will be primarily directed toward only one of the tape guides, namely tape guide 30. As shown in FIGS. 3 and 4, a plate 42 is provided as a fixed guide for both of the tape guides 30 and 32. As shown in FIGS. 6 and 7, the tape guide 30 includes a curved plate 44 which is fixed in relationship to the fixed guide plate 42. The curved plate has top and bottom surfaces with a curved guide bearing 46 therebetween, the preferred curve of the guide bearing being the arc of a circle. The curved guide bearing 46 provides a guide for lengthwise travel of the tape. As shown in FIG. 7, the curved plate 44 is offset from the fixed guide plate 42. This provides the fixed guide plate with a flat surface 48 which guides a top edge of the tape.

Figure 12:
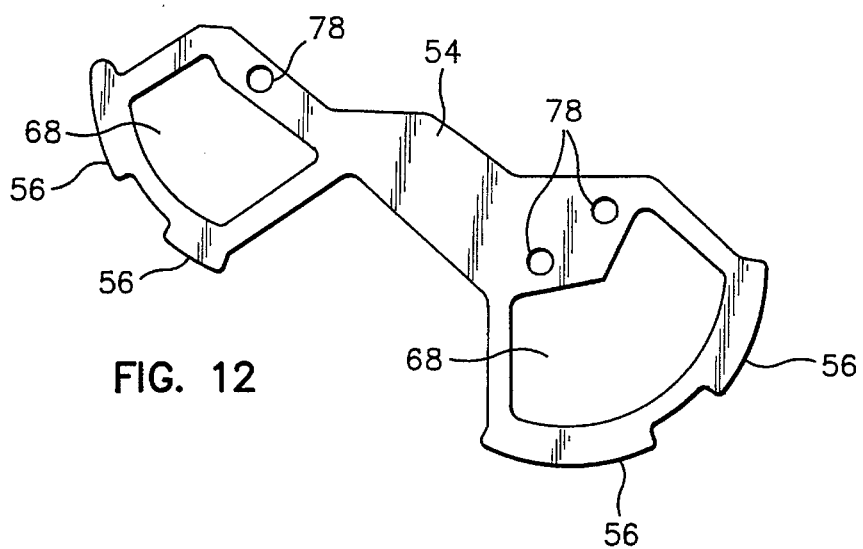
FIG. 12 is an enlarged plan view of the foil portion of the tape guide.
Figure 15:
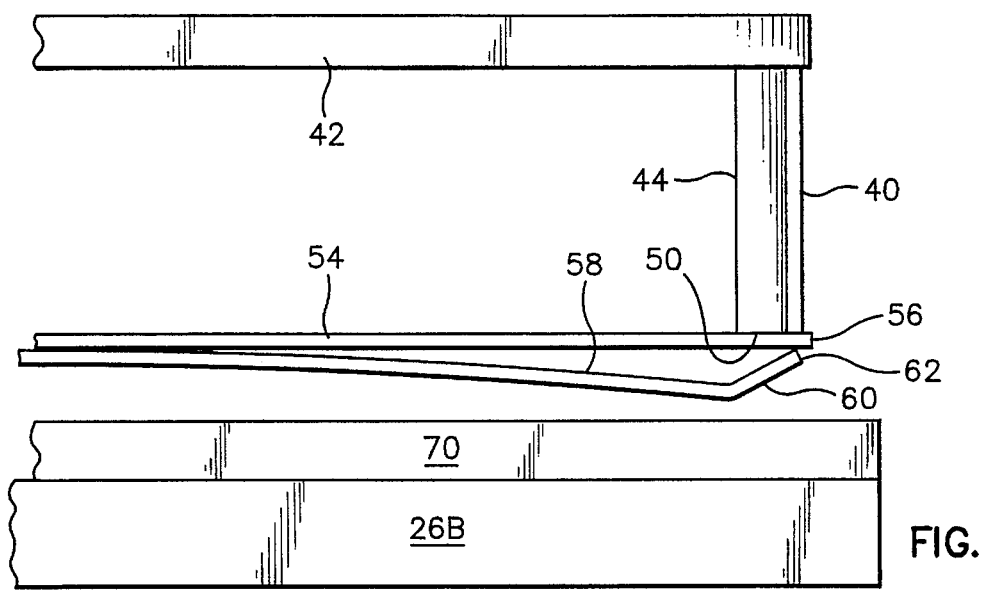
FIG. 15 is an enlarged schematic side illustration (not to scale) of one of the tape guides.

As shown in FIGS. 6, 9, 11 and 15 the curved guide bearing 46 and a bottom surface 50 of the curved plate 44 intersect one another to provide the curved plate 44 with a curved edge 52. A sheet of flexible foil 54 (see FIGS. 8, 12 and 15) is mounted in a fixed relationship with respect to the curved plate 44 and extends across the bottom surface 50. As shown in FIGS. 6, 12 and 15, a portion of the foil extends beyond the curved edge 52 of the curved plate 44 to provide a cantilevered foil portion 56 which is engageable with a bottom edge of the tape.

Figure 8:
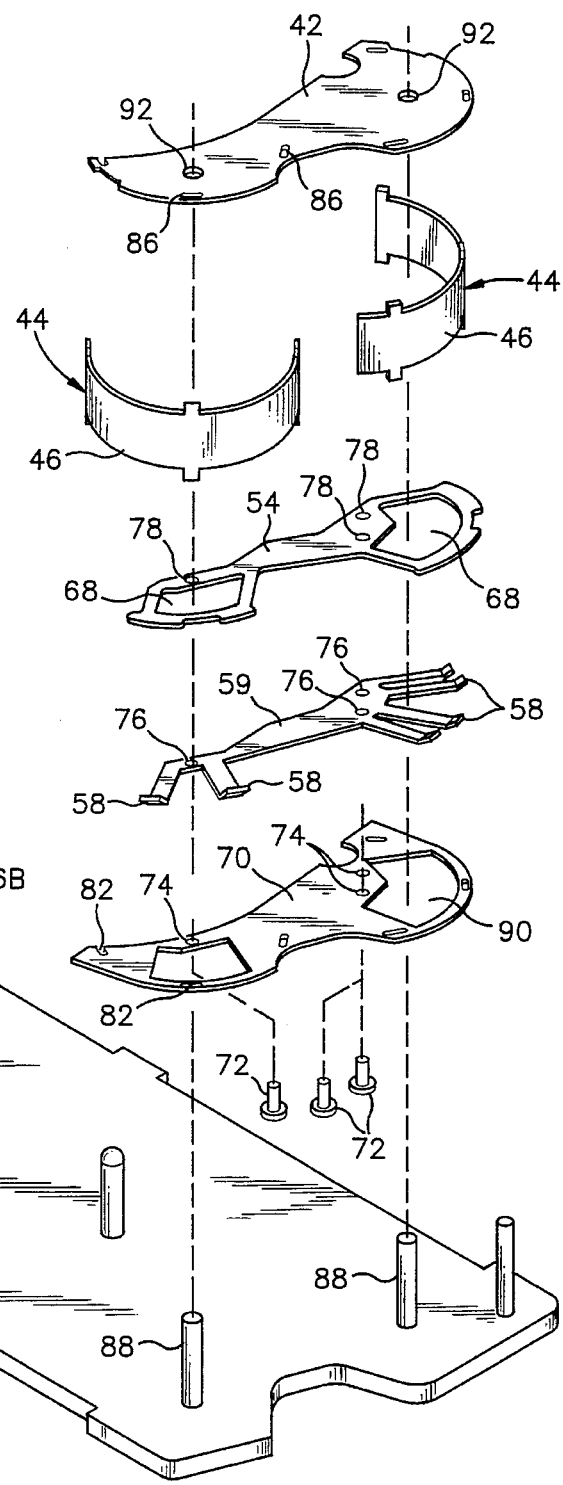
FIG. 8 is an exploded isometric view of the pair of tape guides.
Figure 14:
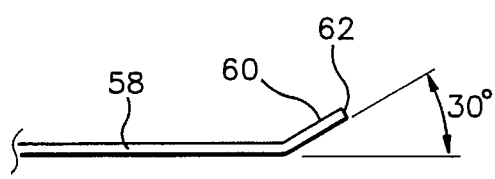
FIG. 14 is a schematic illustration (not to scale) of a side view of the outer end of a single spring finger.
Figure 13:
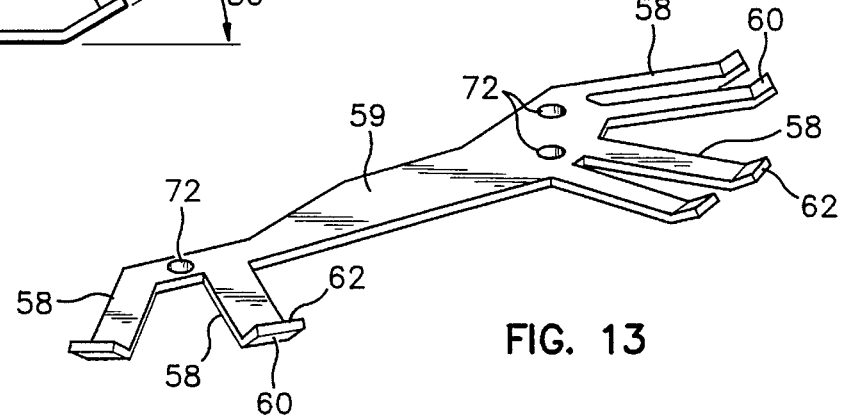
FIG. 13 is an enlarged isometric view of the spring component of the tape guides.

A spring device is mounted in a fixed relationship with respect to the foil 54 for urging the cantilevered foil portion 56 toward the bottom edge of the tape. As shown in FIGS. 8 and 13, the spring device may include a plurality of springs in the shape of fingers 58 which are joined together by a palm portion 59. The fingers 58 and the palm portion 59 may be constructed of spring material, such as stainless steel. The flexible foil 54 and the fingers 58 provide a variable guide for the bottom edge of the tape. Each finger 58 has first and second ends with an elongate portion between. The first end is fixed in relationship to the curved plate 44 and the second end has a tab 60 which extends at an angle from the elongate portion of the finger. As shown in FIG. 14, this angle may be 30°. As shown in FIG. 15, the tab portion 60 of the finger has a terminal end 62 which directly engages the cantilevered foil portion 56.

As shown in FIG. 3, the tape 40 is engageable with the tape guide 30 between beginning and ending tangent lines 64 and 66. The tangent line 66 is substantially constant while the tangent line 64 increases or decreases in distance with respect to the tangent line 66 depending upon the amount of tape wound on the reel 38. The least tangent line 64, that is the line 64 which is the closest to the tangent line 66, is utilized for design purposes. This line will be established when the least amount of tape is wound on the reel 38. The cantilevered foil portion 56 and particularly the fingers 58 are located between these beginning and ending tangent lines 64 and 66.

It is desirable that the sheet of flexible foil 54 serve merely as a load distributor along its cantilevered portion 56 and that it respond to the forces applied by the fingers 58. Accordingly, it is important to minimize any spring force exerted by the sheet of flexible foil 54. This purpose can be served by providing the sheet of flexible foil 54 with a pair of generally large central apertures 68, as shown in FIG. 8

In the mounting of the above components a bottom plate 70 may be employed (see FIG. 8). The bottom plate 70, the palm portion 59 along with the spring fingers 58 and the sheet of foil 54 are fixed together in a planar relationship by rivets or other fastener 72 which extend through apertures 74, 76 and 78 respectively. The curved plate 44 is provided with downwardly extending tabs 80 which extend through the six apertures 82 in the bottom plate 70 to engage the bottom plate 26B of the cartridge container. The tabs 80 are longer than the thickness of the bottom plate 70 so that a space 84 (see FIGS. 6 and 15) is provided between the top of the bottom plate 70 and the bottom surface 50 of the curved plate 44 to allow for free movement of the fingers 58 against the cantilevered foil portion 56. As shown in FIG. 8, the curved plate 44 has upwardly extending tabs 84 which extend through the six apertures 86 in the fixed guide plate 42. As illustrated in FIGS. 8 and 6, the bottom plate 26B of the cartridge has posts 88 which extend upwardly through apertures 90 in the bottom plate 70, thence between the spring fingers 58, thence through the foil apertures 68, thence within the curved plates 44 and then through apertures 92 in the top plate 42. As shown in FIG. 6, bolts 94 may be threaded on the top of the posts 88 to secure the entire assembly.

It is now readily apparent that the cantilevered foil portion 56 will distribute the load of the fingers 58 on the bottom edge of the tape as it travels lengthwise along the curved guide bearings 46 of the plates 44. This will urge the top edge of the tape into continuous engagement with the surface 48 (see FIG. 7) of the fixed guide plate 42 so that the tape follows a reliable path past the head 24. The movable guide components comprising the sheet of flexible foil 54 and the fingers 58 are constructed to permit relative motion between them, hence frictional damping, such that detrimental vibrations will not be generated and transferred from these materials to the moving tape.

Referring to FIG. 15, it is desirable that the engagement of the terminal end 62 of the tab 60 with the cantilevered foil portion 56 extend no further out than the outside edge of the tape 40. If the engagement is further out the cantilevered foil portion 56 will ride on the outside edge of the tape causing undesirable wear of the tape. The most desirable location for the engagement is between the thickness of the tape 40, as shown in FIG. 15. Because of design tolerances it is difficult to obtain this optimum arrangement. Accordingly, it is better to err with the engagement between the finger tab end 62 and the foil 54 located inside the inner surface of the tape 40. When so located the cantilevered foil portion 56 will bend upwardly in a conical fashion to provide a smooth surface for applying the variable load on the edge of the tape 40.

Figure 5:
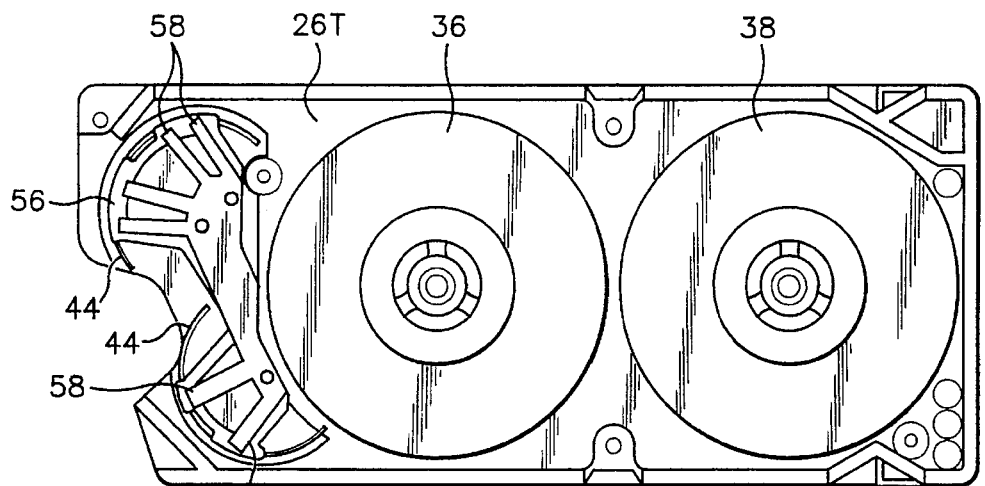
FIG. 5 is a bottom planar view of the cartridge with the bottom plate removed to show various details of the pair of tape guides.

The following table documents the out of plane deformation of the fingers 58 and the lengths of the fingers' elongated portions and tab portions. As stated hereinabove, each tab portion 60 is formed at 30° (other angles permissible) to the plane of the elongated portion of each finger. The fingers 58 are numbered from 1–6 starting with the bottom finger in FIG. 5. The spring constant of each finger is k. This table sets forth an exemplary design for a prototype of the above-described embodiment of the present invention.

TABLE

| FINGER NO. | FINGER LENGTH | MAIN FINGER LENGTH | k | TAB HEIGHT | TOTAL LENGTH | FINGER WIDTH |
| --- | --- | --- | --- | --- | --- | --- |
| 1 | 1.22 MM | 7.00 MM | $6.7 \frac{g}{mm}$ | 0.60 MM | 8.22 MM | 2.5 MM |
| 2 | 1.22 MM | 8.00 MM | $6.7 \frac{g}{mm}$ | .60 MM | 9.22 MM | 3.0 MM |
| 3 | 1.00 MM | 8.16 MM | $4.0 \frac{g}{mm}$ | .50 MM | 9.16 MM | 1.75 MM |

TABLE-continued

| FINGER NO. | FINGER LENGTH | MAIN FINGER LENGTH | k | TAB HEIGHT | TOTAL LENGTH | FINGER WIDTH |
|---|---|---|---|---|---|---|
| 4 | 1.00 MM | 9.16 MM | $4.0 \frac{g}{mm}$ | .50 MM | 10.16 MM | 2.25 MM |
| 5 | 1.00 MM | 8.16 MM | $4.0 \frac{g}{mm}$ | .50 MM | 9.16 MM | 1.75 MM |
| 6 | 1.00 MM | 8.16 MM | $4.0 \frac{g}{mm}$ | .50 MM | 9.16 MM | 1.75 MM |

As stated hereinabove, the compliant guide portion of the tape guide comprises the sheet of flexible foil 54 and the fingers 58. In the above embodiment the compliant guide exerts a total load of 0.078 Newtons on the edge of the tape for each tape guide 30 and 32. The length of the tape guide 30 (length between tangent lines 64 and 66 in FIG. 3) is 20 mm and the length of the tape guide 32 is slightly longer. However, it reasonable for the load on the edge of the tape per guide to be in the range of 0.010 to 1.000 Newtons. The arc of each guide can be in the range of 2 mm to 200 mm. The preferred load per unit length of the arc of each guide is 6 mN/mm for the guide 30 and 3.5 mN/mm for the guide 32. An acceptable range for this parameter is 0.5 mN/mm to 30 mN/mm.

In the prototype the thickness of the sheet of flexible foil 54 and the thickness of the spring fingers 58 were each 0.076 mm for stainless steel. The range in the thickness of the sheet of flexible foil could be from 0.013 mm to 0.254 mm. The range in the thickness of the spring finger could be from 0.050 mm to 0.254 mm. Other materials for these components can be stainless steel, brass, copper, ceramic, or plastic, depending upon the modulous of elasticity and wear properties desired.

Figure 16:
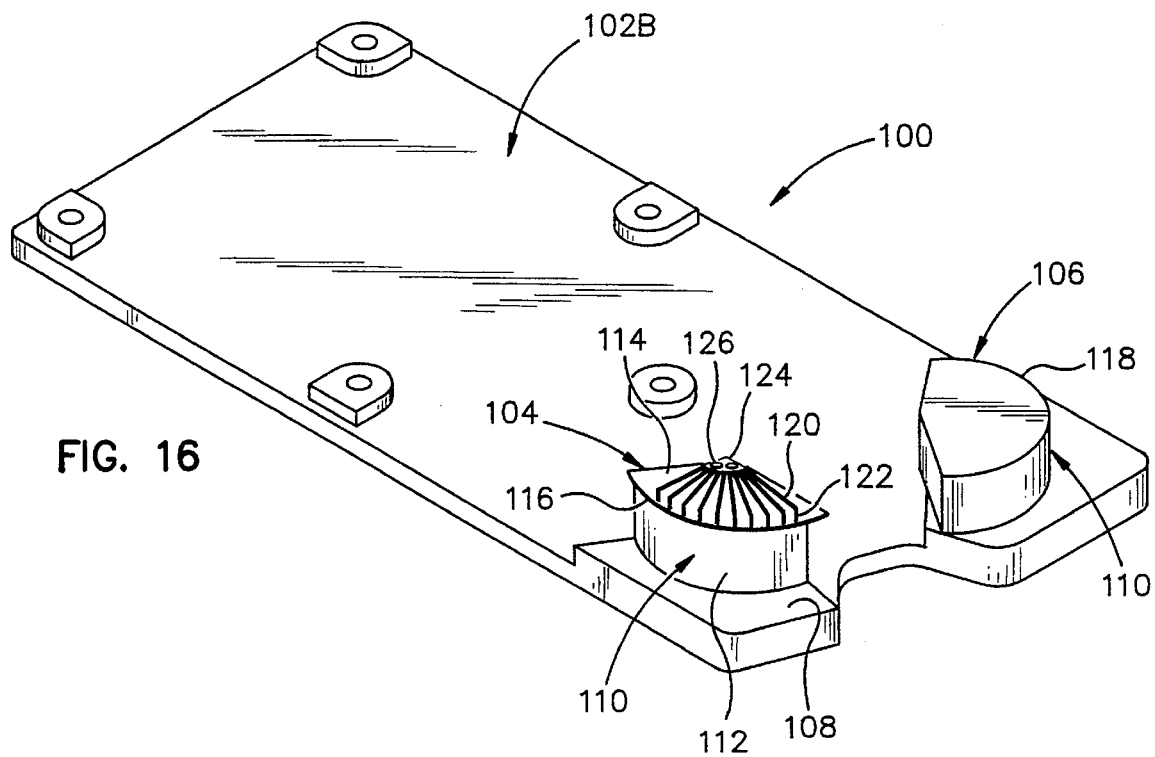
FIG. 16 is a top view of another embodiment of a magnetic tape cartridge with its top cover removed to show various details of a pair of tape guides and with the spring fingers and foil removed from one of the tape guides.
Figure 17:
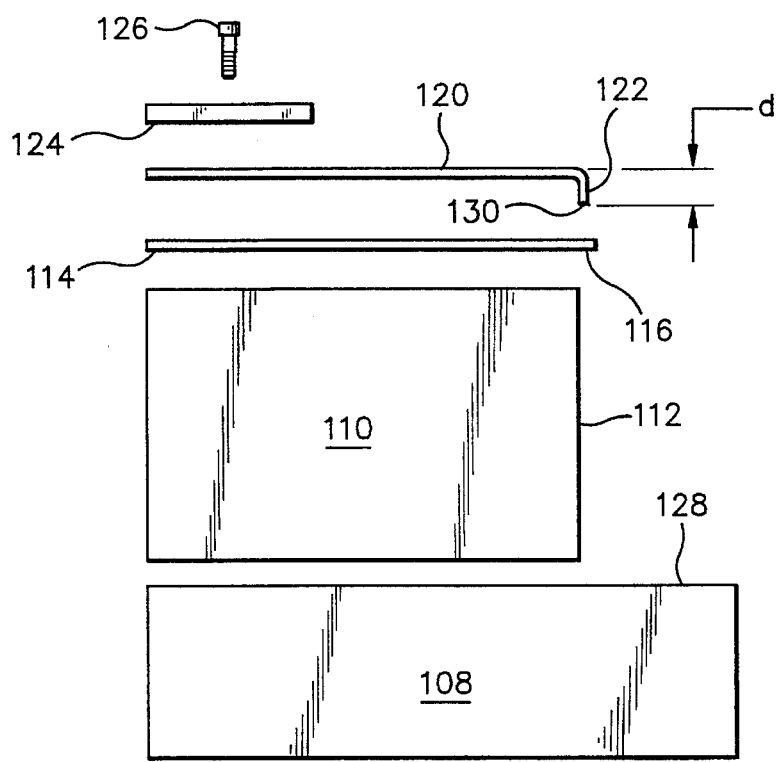
FIG. 17 is an exploded schematic illustration (not to scale) of the FIG. 16 tape guide embodiment.

Another embodiment of the magnetic tape cartridge is schematically illustrated at 100 in FIGS. 16 and 17, with portions removed to show various details. The magnetic tape cartridge is provided with a pair of tape guides 104 and 106, only a portion of the tape guide 106 being shown in the figure. Only the tape guide 104 will be described since the tape guides 104 and 106 are substantially the same. The tape guide 104 includes a raised portion 108 which is mounted on the bottom cartridge plate 102B to provide a fixed guide for the bottom edge of the tape. A block 110 is mounted on the raised portion 108 and has a curved bearing surface 112, which may be an arc of a circle, for lengthwise travel of the tape. A sheet of flexible foil 114 is mounted on top of the block 110 and has a cantilevered portion 116 which extends beyond a curved edge of the block, which curved edge can be seen on the right hand block at 118. A plurality of springs in the form of fingers 120 are mounted on top of the flexible foil portion 114, each finger having a tab portion 122 which engages the top of the cantilevered foil portion 116 to apply a downward force on a top edge of the tape. A retainer block 124 may be located on top of the fingers 120 and the sheet of flexible foil 114 and the block may be bolted by bolts 126 to the block 110 to hold these components in place. This embodiment differs from the previous embodiment in that the variable tape guide comprising the sheet of flexible foil 114 and the fingers 120 is located at the top of the cartridge container 74, the fingers 120 are narrower in width than those of the previous embodiment, and the sheet of flexible foil 114 has not been provided with apertures.

FIG. 17 is a schematic exploded illustration, not to scale, of the FIG. 16 embodiment. The curved bearing surface 112 of the block 110 will guide lengthwise travel of the tape, the surface 128 of the raised portion 108 provides a fixed guide for the bottom edge of the tape and the combination of the cantilevered foil portion 116 and the fingers 120 (one finger shown in FIG. 17) provide the variable guide for the top edge of the tape. A terminal end 130 of the tab 122 engages the top of the cantilevered foil portion 116 to urge this cantilevered foil portion against the top edge of the tape.

The distance d, illustrated in FIG. 17, is important in establishing the load applied to the cantilever foil portion 116. The amount of load applied to the edge of the tape depends upon the spring constant k of each finger 120. An equation to describe the relationship is $f=kd$ where f is the force applied by a finger 120 to the cantilever foil portion 116. It can be seen that if either the spring constant or the distance d is increased, the force on the cantilever foil portion 116 is likewise increased. It is desirable to keep the spring constant k of each finger low so as to minimize the impact of manufacturing tolerances on the overall load transmitted to the tape.

Obviously, many modifications and variations of the invention are possible in light of the above teaching. For example, in FIG. 8, another implementation of the invention is to have a flexible foil 54 and spring fingers 58 on both sides of the guide bearings 46. Such a configuration would permit spring bias on both edges of the tape, urging the tape to a central position on the guide bearings. The spring constants and loading from each set of flexible foil and spring fingers could differ from one another significantly. It is therefore to be understood that within the scope of the appended claims the invention may be practiced otherwise than as has been specifically described.

We claim:

1. A recordable media tape handling device comprising:
   a curved element which has first and second oppositely facing surfaces with a curved guide bearing surface therebetween for supporting lengthwise travel of a magnetic tape, the second surface of the curved element and the curved guide bearing surface meeting to provide the curved element with a curved edge;
   means fixed with respect to the curved element for providing a fixed guide for engaging a first edge of the magnetic tape, the fixed guide having a surface which is substantially coextensive with the first surface of the curved element; and
   a variable guide mounted on the second surface of the curved element, the variable guide including:
   a sheet of flexible foil having first and second oppositely facing surfaces;
   said sheet of flexible foil being fixed in relationship to the curved element with its surfaces extending across the second surface of the curved element;
   a portion of the flexible foil extending beyond the curved edge to provide a cantilevered foil portion;

a first surface of the cantilevered foil portion being engageable with a second edge of the magnetic tape; and a plurality of elongate discrete spring members fixed in relationship to the curved element and slidably engaging the second surface of the sheet of flexible foil for urging the cantilevered foil portion toward the second edge of the magnetic tape so as to engage the first surface of the cantilevered foil portion with said second edge of the magnetic tape for guiding the magnetic tape.

2. A device as claimed in claim 1 including:

said magnetic tape; and the magnetic tape engaging the curved guide bearing surface of the curved element.

3. A device as claimed in claim 1 including:

the curved guide bearing surface of the curved element for longitudinally guiding the magnetic tape along a length which is determined by beginning and ending locations of engagement of the magnetic tape with the curved guide bearing; and the elongate spring members being located between the beginning and ending locations of engagement of the magnetic tape with the curved guide bearing surface.

4. A device as claimed in claim 1 including:

the elongate spring members further for providing an urging force on the cantilevered foil portion per length in the range of 0.5 mN/mm to 30 mN/mm.

5. A device as claimed in claim 1 including:

the sheet of flexible foil being stainless steel and having a thickness in the range of 0.013 mm to 0.254 mm.

6. A device as claimed in claim 1 including:

the sheet of flexible foil having at least one aperture which is located remotely from said cantilevered foil portion.

7. A device as claimed in claim 1 further including, in combination:

the recordable media handling device being a magnetic tape cartridge; and said magnetic tape being mounted in the cartridge and engaging the curved guide bearing surface of the curved element between the fixed and variable guides.

8. A device as claimed in claim 1 including:

each elongate spring member having first and second ends with an elongate portion therebetween, the first end being connected to the curved element and the second end having a tab portion which extends at an angle to the elongate portion of the elongate spring member; and said tab portion having a terminal end surface which directly engages a second surface of the cantilevered foil portion, the second surface of the cantilevered foil portion facing opposite from the first surface of the cantilevered foil portion.

9. A device as claimed in claim 8 including:

the curved guide bearing surface of the curved element for longitudinally guiding the magnetic tape along a length which is determined by beginning and ending locations of engagement of the magnetic tape with the curved guide bearing surface; and the elongate spring members being located between the beginning and ending locations of engagement of the magnetic tape with the curved guide bearing surface.

10. A device as claimed in claim 9 including:

the sheet of flexible foil being stainless steel and having a thickness in the range of 0.013 mm to 0.254 mm; and the elongate spring members further for providing an urging force on the cantilevered foil portion per length in the range of 0.5 mN/mm to 30 mN/mm.

11. A magnetic tape cartridge comprising:

a container;

a pair of reels rotatably mounted in the container and a magnetic tape wound on the reels for lengthwise travel in response to rotation of the reels;

a pair of laterally-spaced curved elements mounted inside the container between one of the reels and the container, each curved element having a top and a bottom with a curved guide bearing therebetween, each curved guide bearing providing a guide for lengthwise travel of the magnetic tape;

the magnetic tape extending across both of the curved guide bearings with a portion of the magnetic tape spanning therebetween, the portion of the magnetic tape being positioned for recording or playback;

means mounted in the container for providing a pair of fixed guides, each fixed guide being engageable with a first edge of the magnetic tape along a respective curved guide bearing of the curved element;

each curved element having a curved edge which is along one of the extremities of a respective curved guide bearing;

flexible foil, which has first and second oppositely facing surfaces, mounted in the container and extending beyond the curved edge of each curved element to provide respective cantilevered foil curved portions; and two pluralities of elongate discrete spring fingers mounted in the container, each plurality of elongate discrete spring fingers slidably engaging the flexible foil for urging a respective cantilevered foil curved portion toward a second edge of the magnetic tape, the flexible foil and said two pluralities of elongate discrete spring fingers providing a pair of variable guides for the second edge of the magnetic tape.

12. A combination including the magnetic tape cartridge of claim 11, the combination comprising:

a tape drive; and the magnetic tape cartridge being mounted in the tape drive for processing.

13. A magnetic tape cartridge as claimed in claim 11, further comprising:

each curved element having a substantially flat surface which intersects a respective curved bearing along a respective curved edge;

the flexible foil extending across the flat surface of each curved element and beyond the curved edge to provide said cantilevered foil curved portions;

each elongate spring finger having first and second ends with an elongate portion therebetween, the first end being connected to a respective curved element and the second end having a tab portion which extends at an angle to the elongate portion of the finger; and the tab portion of each elongate spring finger having a terminal end which directly engages one of said respective cantilevered foil curved portions.

14. A magnetic tape cartridge as claimed in claim 13 comprising:

the curved guide bearing surface of each curved element being capable of guiding the magnetic tape lengthwise along a length which is determined by beginning and ending locations of engagement of the magnetic tape with the curved guide bearing surface; and each cantilevered foil curved portion and the tab portions of the elongate spring fingers being located between beginning and ending locations of engagement of the magnetic tape with the respective curved guide bearing surface.

15. A magnetic tape cartridge as claimed in claim 14 including:

the flexible foil being stainless steel and having a thickness in the range of 0.013 mm to 0.254 mm; and each plurality of elongate spring fingers being capable of providing an urging force on the respective cantilevered foil curved portion per curved length in the range of 0.5 mN/mm to 30 mN/mm.

16. A combination including the magnetic tape cartridge of claim 15, the combination comprising:

a tape drive; and the magnetic tape cartridge being mounted in the tape drive for processing.

17. A tape guide for a magnetic tape handling device comprising:

a support;

a curved guide element mourned on said support and having a curved surface for guiding lengthwise movement of the magnetic tape;

the curved surface of the curved guide element being bounded in part by an edge;

a sheet of flexible material having oppositely facing first and second flat surfaces:

the sheet of flexible material being mounted on said support and having a cantilevered portion which extends beyond said edge of said curved surface:

the cantilevered portion having a first flat surface which is engageable with an edge of the magnetic tape; and a plurality of discrete finger springs mounted on said support and slidably engaging said second flat surface of the sheet of flexible material for urging the first flat surface of the cantilevered portion into engagement with said edge of the magnetic tape.

18. A tape guide as claimed in claim 17 including:

the cantilevered portion having a high degree of stiffness parallel to said lengthwise travel of the magnetic tape and very low stiffness perpendicular to the lengthwise travel of the magnetic tape.

19. A tape guide as claimed in claim 18 including:

the sheet of flexible material being stainless steel foil.

20. A tape guide as claimed in claim 19 including:

the thickness of the sheet of stainless steel foil being in range of 0.013 mm to 0.254 mm.

21. A tape guide as claimed in claim 20 including:

each finger spring being stainless steel foil and having a thickness in the range of 0.050 mm to 0.254 mm.

22. A tape guide as claimed in claim 21 including:

the finger springs providing an urging force on the cantilevered portion per length ha the range of 0.5 mN/mm to 30 mN/mm.

23. A tape guide as claimed in claim 22 including:

the cantilevered portion having a second flat surface which faces opposite from its first flat surface; and each finger spring having a terminal end which engages the second flat surface of the cantilevered portion substantially opposite an edge of the magnetic tape.

24. A tape guide as claimed in claim 23 including:

each finger spring being bent to form a long portion and a short portion; and each short portion ending in a respective terminal end.

25. A magnetic tape cartridge including a pair of tape guides as claimed in claim 24 including:

a housing:

the pair of tape guides being mounted in the housing in a spaced apart relationship;

a pair of reels mounted in the housing;

a magnetic tape being wound on the reels and engaging the curved element of each tape guide.

26. A magnetic tape drive including the magnetic tape cartridge of claim 25 including:

a drive housing;

a magnetic head for recording and reading magnetic tape; and the magnetic tape cartridge being mounted in the drive housing with the tape in a transducing relationship with respect to the magnetic head.

27. In a tape handling device which includes a support, a tape guide for guiding a tape comprising:

a guide element mounted on said support and having a guide surface for guiding lengthwise movement of the tape;

the guide surface of the guide element being bounded in part by an edge;

a sheet of flexible material having oppositely facing first and second flat surfaces which are bounded in part by an edge portion;

the sheet of flexible material being mounted on said support so as to have a cantilevered portion which extends beyond said edge of said guide surface;

the cantilevered portion being bounded in part by said edge portion and having a flat guide surface which is a portion of said first flat surface of the sheet of flexible material;

the edge portion of the cantilevered portion extending beyond the edge of the guide surface with the flat guide surface of the cantilevered portion being engageable with the tape; and a plurality of discrete finger springs mounted on said support and slidably engaging said second flat surface of the sheet of flexible material for urging said flat guide surface of the cantilevered portion into engagement with an edge of the tape.

28. A tape handling device as claimed in claim 27 including:

the cantilevered portion having a high degree of stiffness parallel to said lengthwise movement of the magnetic tape and very low stiffness perpendicular to the lengthwise travel of the tape.

29. A tape handling device as claimed in claim 28 including:

the sheet of flexible material being stainless steel foil.

30. A tape handling device as claimed in claim 29 including:

the thickness of the sheet of stainless steel foil being in range of 0.013 mm to 0.254 mm.

31. A tape handling device as claimed in claim 30 including:

each finger spring being stainless steel foil and having a thickness in the range of 0.050 mm to 0.254 mm.

32. A tape handling device as claimed in claim 31 including:

the finger springs providing an urging force on the cantilevered portion per length in the range of 0.5 mN/mm to 30 mN/mm.

33. A tape handling device as claimed in claim 32 including:

the cantilevered portion having a flat surface which faces opposite from its flat guide surface; and each finger spring having a terminal end which engages the flat surface of the cantilevered portion substantially opposite said edge of the tape.

34. A tape handling device as claimed in claim 33 including:

each finger spring being bent to form a long portion and a short portion; and each short portion ending in a respective terminal end which slidably engages the second flat surface of the sheet of flexible material.

35. A tape handling device including a pair of tape guides as claimed in claim 34 including:

a housing:

the pair of tape guides being mounted in the housing in a spaced apart relationship;

the guide element being a curved guide element with a curved guide surface;

a pair of reels mounted in the housing;

magnetic tape;

said magnetic tape being wound on the reels and engaging the curved guide surface of the curved guide element of each tape guide.

36. A magnetic tape drive including the tape handling device of claim 36 including:

a drive housing;

a magnetic head for recording and reading said magnetic tape; and the tape handling device being mounted in the drive housing with the magnetic tape in a transducing relationship with respect to the magnetic head.

* * * * *

UNITED STATES PATENT AND TRADEMARK OFFICE
CERTIFICATE OF CORRECTION

PATENT NO. : 5,519,562

DATED : May 21, 1996

INVENTOR(S) : Argumedo et al.

Page 1 of 2

It is certified that error appears in the above-indentified patent and that said Letters Patent is hereby corrected as shown below:

Column 9, line 21, between "bearing" and ";" insert --surface--;

Column 10, line 49, after " curved" insert --guide--;
"       ", line 65, delete "surface";

Column 11, line 2, delete "surface" and after "and" begin "each" as a new paragraph;
Column 11, line 4, after "between" insert --the--;
"       ", line 7, delete "surface";
"       ", line 27, delete "the" and insert therefor --a--;
"       ", line 45, delete "travel" and insert therefor --movement--;
"       ", line 47, delete "travel" and insert therefor --movement--;
Column 12, line 11, after "curved" insert --guide--;
"       ", line 21, after "guiding a" insert --magnetic--;
"       ", line 23, after "of the" insert --magnetic--;
"       ", line 42, after "with the" insert --magnetic--;
"       ", line 47, after "of the" insert --magnetic--;
"       ", line 53, delete "travel" and insert therefor --movement-- and after "of the" insert --magnetic--; and

UNITED STATES PATENT AND TRADEMARK OFFICE
CERTIFICATE OF CORRECTION

PATENT NO. : 5,519,562
DATED : May 21, 1996
INVENTOR(S) : Argumedo et al.

It is certified that error appears in the above-indentified patent and that said Letters Patent is hereby corrected as shown below:

Column 13, line 10, between "the" and "tape" insert --magnetic--.

Signed and Sealed this

Eighth Day of April, 1997

*Attest:*

BRUCE LEHMAN

*Attesting Officer*   *Commissioner of Patents and Trademarks*